US012619588B2

(12) United States Patent
Schirmer et al.

(10) Patent No.: US 12,619,588 B2
(45) Date of Patent: May 5, 2026

(54) SYSTEM AND METHODS FOR RETRIEVAL-AUGMENTED GENERATION SEARCHES OF UNSTRUCTURED AND STRUCTURED INFORMATION

(71) Applicant: SAP SE, Walldorf (DE)

(72) Inventors: Oliver Schirmer, Heidelberg (DE); Frank Feinbube, Potsdam (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/743,756

(22) Filed: Jun. 14, 2024

(65) Prior Publication Data

US 2025/0384019 A1     Dec. 18, 2025

(51) Int. Cl.
*G06F 16/22*          (2019.01)
*G06F 16/248*         (2019.01)

(52) U.S. Cl.
CPC ........ *G06F 16/2237* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 12,405,985 B1 * | 9/2025 | Kanagovi | G06F 16/335 |
| 12,511,301 B1 * | 12/2025 | Cetoli | G06F 16/24578 |
| 12,511,810 B2 * | 12/2025 | Klingler | G06T 13/40 |

| | | | |
|---|---|---|---|
| 2023/0274081 A1 * | 8/2023 | Fan | G06F 40/279 |
| | | | 715/230 |
| 2023/0351753 A1 * | 11/2023 | Gorti | G06V 20/47 |
| 2024/0289863 A1 * | 8/2024 | Smith Lewis | G06N 3/008 |
| 2025/0190460 A1 * | 6/2025 | Madisetti | G06F 16/3329 |
| 2025/0231973 A1 * | 7/2025 | Kelsey | G06F 16/3329 |
| 2025/0247211 A1 * | 7/2025 | Roopan | H04L 9/0822 |
| 2025/0265442 A1 * | 8/2025 | Brown | G06F 40/40 |
| 2025/0315488 A1 * | 10/2025 | Baek | G06F 16/93 |

(Continued)

OTHER PUBLICATIONS

LLM Intelligent Agent Tutoring in Higher Education Courses using a RAG Approach (Year: 2024).*

(Continued)

*Primary Examiner* — Kim T Nguyen
(74) *Attorney, Agent, or Firm* — Buckley, Maschoff & Talwalkar LLC

(57)          ABSTRACT

A Retrieval-Augmented Generation ("RAG") framework may include an RAG vector data store with information about vector embeddings. An RAG pre-processing platform may access unstructured data and perform vector embedding to generate a vector embedding for unstructured data to be stored in the RAG vector data store. The RAG pre-processing platform may also access structured data from the knowledge base and create a summary and metadata about the structured data to be stored in the RAG vector data store. An RAG retriever platform may receive a user prompt from a user, perform vector embedding, and retrieve context-relevant information for unstructured and structured data by searching for similar embeddings in the RAG vector data store. An RAG reader platform may combine the context-relevant information with the user prompt and an RAG prompt to create a LLM prompt. A context-aware response is then output to the user.

21 Claims, 16 Drawing Sheets

(56)                References Cited

U.S. PATENT DOCUMENTS

2025/0384019 A1 *  12/2025  Schirmer  ............  G06F 16/2237
2025/0384021 A1 *  12/2025  Thomas  ..............  G06F 16/2237
2025/0390520 A1 *  12/2025  Madisetti  ............  G06F 16/3329

OTHER PUBLICATIONS

Retrieval Augmented Generation and Representative Vector Summarization for Large Unstructured Textual Data in Medical Education (Year: 2023).*

Communication: "Extended European Search Report", Feb. 18, 2025 (Feb. 18, 2025), European Patent Office, for European Application No. 24204943.5-1203, 11 pages.

Dash, Suni Kumar "Building a RAG Pipeline for Semi-structured Data with Langchain", Jan. 20, 2024 (Jan. 20, 2024), XP093247149, (pp. 1-9, 9 total pages), Retrieved from the Internet: URL:https://web.archieve.org/web/20240120062617/https://www.analyticsvidhya.com/blog/2023/12/building-a-rag-pipeline-for-semi-structred-data-with -langchain/.

Yang, Hang et al., "A Method for Parsing and Vectorization of Semi-structured Data used in Retrieval Augmented Generation", May 8, 2024 (May 8, 2024), XP093246909, (pp. 1-20 pages), Retrieved from the Internet: URL:https://arxiv.org/pdf/2405.03989.

Dong, Kuicai et al., "Multi-view Content-aware Indexing for Long Document Retrieval", arXiv:2404.15103v1 [cs.CL], arxiv.org, Apr. 23, 2024, (pp. 1-14), XP091736718.

Ogüz, Barlas et al., "UniK-QA: Unified Representations of Structured and Unstructured Knowledge for Open-Domain Question Answering", arXiv:2021.14610v3 ]cs. CL], May 3, 2022 (May 3, 2022), (pp. 1-12), XP093246783, DOI: 10. 18653/v1/2022.findings-naacl.115, Retrieved from the Internet: URL:https://arxiv.org/pdf/2012.14610.

* cited by examiner

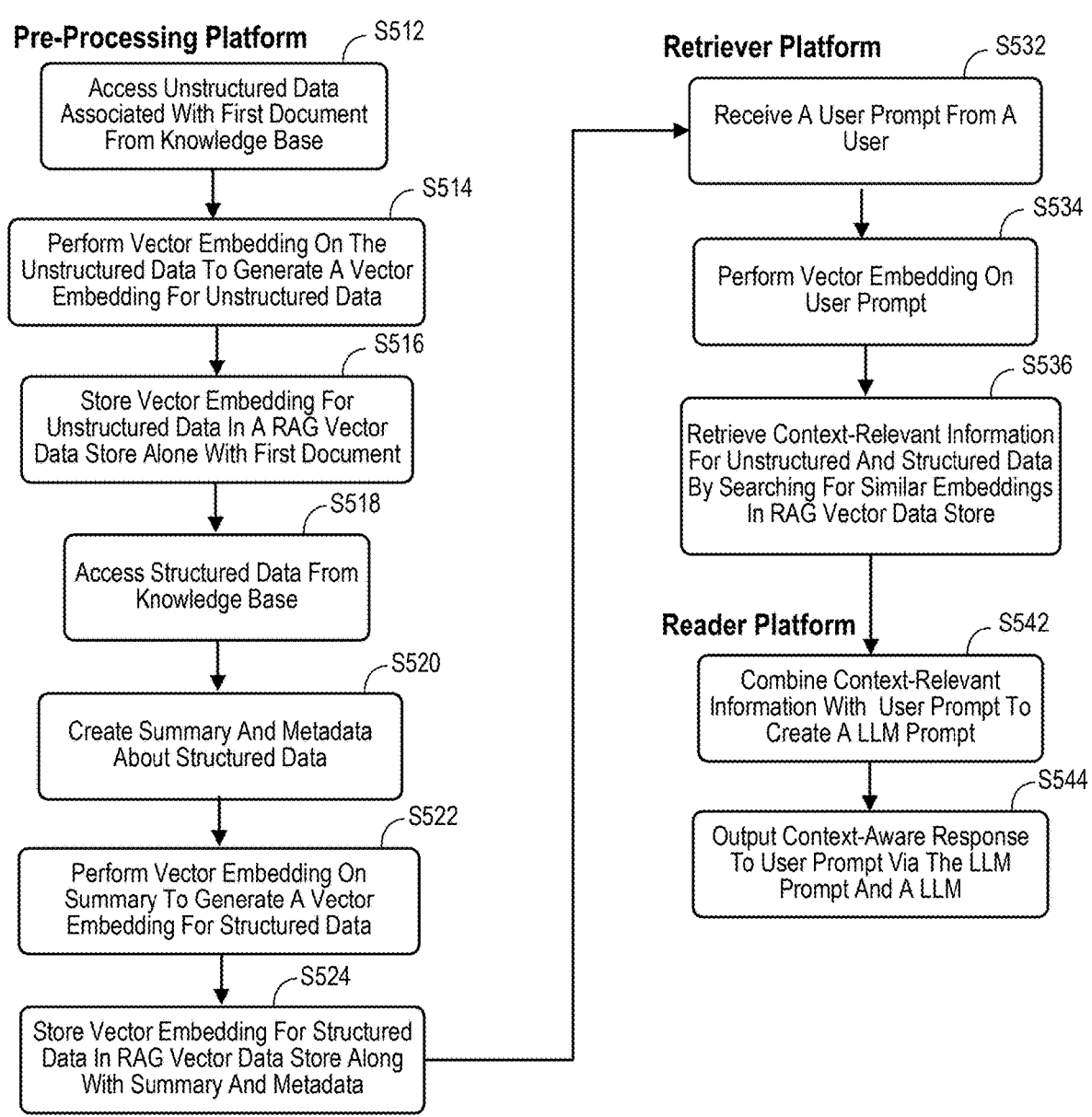

Pre-Processing Platform ⟋S512

Access Unstructured Data Associated With First Document From Knowledge Base

⟋S514

Perform Vector Embedding On The Unstructured Data To Generate A Vector Embedding For Unstructured Data

⟋S516

Store Vector Embedding For Unstructured Data In A RAG Vector Data Store Alone With First Document

⟋S518

Access Structured Data From Knowledge Base

⟋S520

Create Summary And Metadata About Structured Data

⟋S522

Perform Vector Embedding On Summary To Generate A Vector Embedding For Structured Data

⟋S524

Store Vector Embedding For Structured Data In RAG Vector Data Store Along With Summary And Metadata

Retriever Platform ⟋S532

Receive A User Prompt From A User

⟋S534

Perform Vector Embedding On User Prompt

⟋S536

Retrieve Context-Relevant Information For Unstructured And Structured Data By Searching For Similar Embeddings In RAG Vector Data Store

Reader Platform ⟋S542

Combine Context-Relevant Information With User Prompt To Create A LLM Prompt

⟋S544

Output Context-Aware Response To User Prompt Via The LLM Prompt And A LLM

Receive, From User, User Query Via An
Immersive Virtual Experience

S720

Perform RAG LLM Analysis
Based On Unstructured And
Structured Data

S730

Output, To The User, Context-Aware
Response Via The Immersive Virtual
Experience

S1010

Access Structured Documents From Knowledge Base

S1020

Use Summary Prompt And Summary LLM To Automatically Create Summaries And Metadata

S1030

Perform Embedding Process On Summaries And Attach Metadata

S1040

Store Embeddings For The Structured Documents In Vector Database Along With Embedding For Summaries (With Metadata Attached)

S1210

Perform Similarity Search Based On User Prompt And Vector Database

S1220

Determine Relevant Summary And Metadata For Structured Documents

S1230

Retrieve Relevant Structured Documents

S1240

Output Context Aware Response Based On LLM And LLM Prompt

1400

| RAG USER QUERY IDENTIFIER 1402 | SIMILARITY SEARCH RESULTS 1404 | SUMMARY AND METADATA FOR STRUCTURED DATA 1406 | RAG PROMPT 1408 | CONTEXT-AWARE RESPONSE 1410 |
|---|---|---|---|---|
| UQ_101 | | | | |
| UQ_102 | | | | |
| UQ_103 | | | | |

SYSTEM AND METHODS FOR RETRIEVAL-AUGMENTED GENERATION SEARCHES OF UNSTRUCTURED AND STRUCTURED INFORMATION

BACKGROUND

A Large Language Model ("LLM") achieves general-purpose language generation and other natural language processing. Based on language models, LLMs acquire these abilities by learning statistical relationships from substantial amounts of text (e.g., from a knowledge base) during a training process. LLMs can be used for generative AI, by taking an input text or prompt and predicting future tokens or words using artificial neural networks. In some cases, an LLM may answer user queries in various contexts by cross-referencing knowledge sources. Some drawbacks of the basic LLM approach include presenting false information (or "hallucinations") and responses with out-of-date or generic information.

To address these and other issues, Retrieval-Augmented Generation ("RAG") optimizes the output of a LLM so that it references an authoritative knowledge base outside of the original training data sources. RAG can extend LLM capabilities to specific domains or an organization's internal knowledge base without retraining the model. For example, FIG. 1 is a high-level system 100 RAG architecture that includes a LLM 110, a vector search 120, and a vector data store 130. FIG. 2 is a basic RAG method that begins with receiving a user query at S210. In response to the user query, the LLM 110 interprets the query using embedding at S220. A vector search 120 is performed using information in the vector data store 130 at S230. The vector data store 130 might be populated with, for example, with information gathered from a knowledge base of enterprise documents (e.g., emails, memos, reports, etc.). The vector search 120 returns relevant context information specific to that enterprise which is be used by the LLM 110 to generate an appropriate response to the user query at S240. In this way, RAG redirects the LLM 110 to retrieve relevant context information from authoritative, pre-determined knowledge sources gives an organization control over the text output that is generated. In this way, RAG may provide a cost-effective Artificial Intelligence ("AI") implementation (because the LLM 110 does not need to be retrained with the new data) and more current information can be included without retraining.

RAG has been very successful at determining relevant context information for a user prompt based on information extracted from unstructured data. As used herein, the phrase "unstructured data" may refer to information that does not have a pre-defined data model and is not organized in a pre-defined manner (e.g., documents, emails, chat group conversations, transcripts, etc.). RAG has been less successful, however, understanding and using structured data, such as a list of employee names and their roles within an organization, a list of projects and sub-projects, etc. The typical RAG embedding process and vector search cannot readily store this type of information within a vector data store and/or utilize the information to determine relevant context information responses to a user query.

It would therefore be desirable to provide an RAG framework that supports unstructured and structured data in a secure, automatic, and efficient manner.

SUMMARY

According to some embodiments, methods and systems associated with an Retrieval-Augmented Generation ("RAG") framework may include an RAG vector data store with information about vector embeddings. An RAG pre-processing platform may access unstructured data and perform vector embedding to generate a vector embedding for unstructured data to be stored in the RAG vector data store. The RAG pre-processing platform may also access structured data from the knowledge base and create a summary and metadata about the structured data to be stored in the RAG vector data store. An RAG retriever platform may receive a user prompt from a user, perform vector embedding, and retrieve context-relevant information for unstructured and structured data by searching for similar embeddings in the RAG vector data store. An RAG reader platform may combine the context-relevant information with the user prompt and an RAG prompt to create a LLM prompt. A context-aware response is then output to the user.

Some embodiments comprise: means for receiving, by an RAG retriever platform, a user prompt from a user; means for performing, by the RAG retriever platform, vector embedding on the user prompt; means for retrieving, by the RAG retriever platform, context-relevant information for unstructured and structured data; means for searching, by the RAG retriever platform, for similar embeddings in the RAG vector data store; means for combining, by an RAG reader platform, the context-relevant information with the user prompt and an RAG prompt to create a LLM prompt; and means for outputting, by the RAG reader platform, a context-aware response to the user prompt via the LLM prompt and a LLM.

Some technical advantages of some embodiments disclosed herein are improved systems and methods to provide a RAG framework that supports unstructured and structured data in a secure, automatic, and efficient manner.

BRIEF DESCRIPTION OF THE DRAWINGS

FIG. 5 is a method according to some embodiments.

FIG. 14 is a portion of an RAG database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
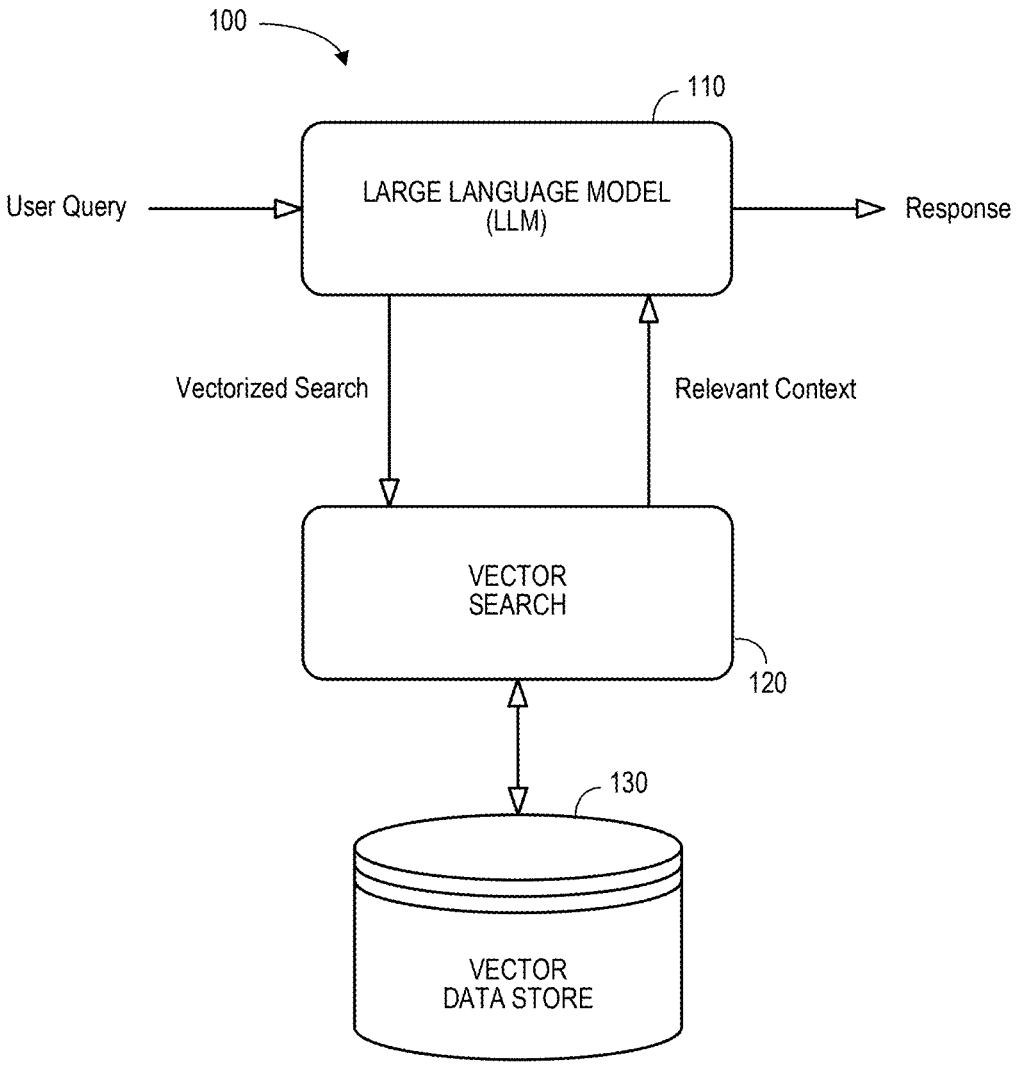
FIG. 1 is a high-level system RAG architecture.
Figure 2:
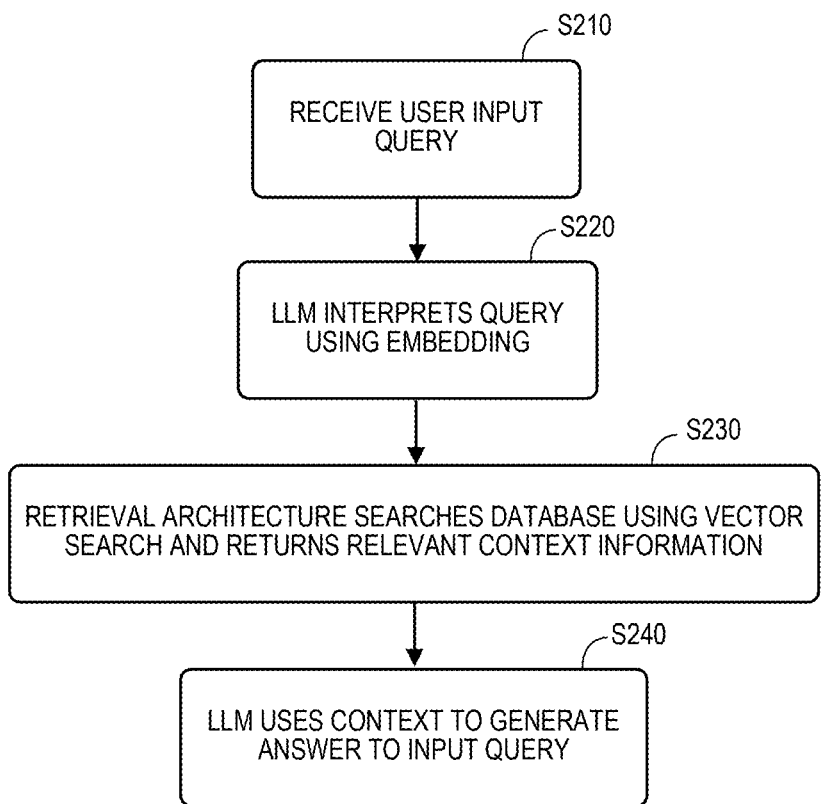
FIG. 2 is a basic RAG method.
Figure 3:
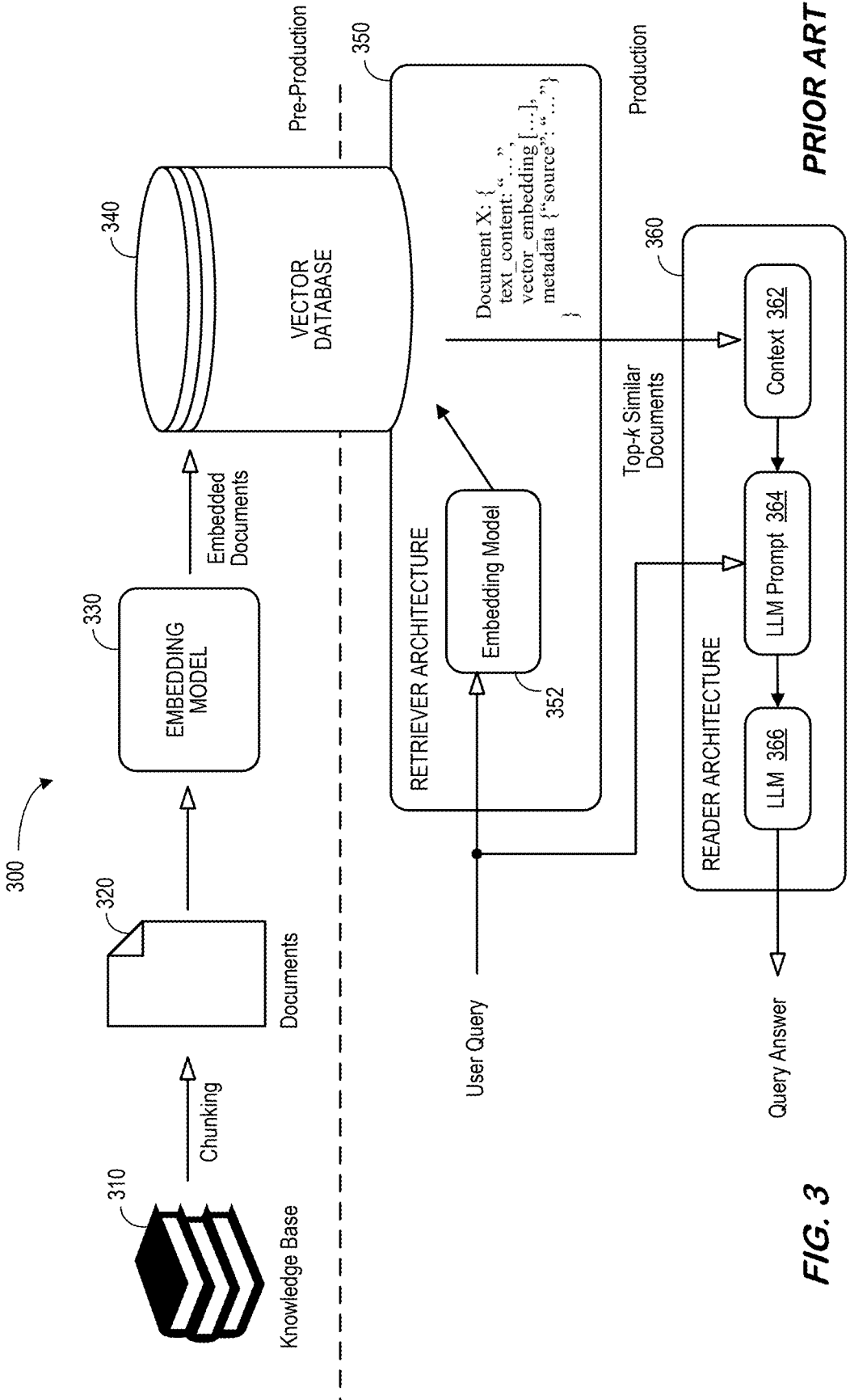
FIG. 3 is a more detailed system RAG architecture.

Given a user question, RAG attempts to find the most relevant snippets from a knowledge base to answer that question. FIG. 3 is a more detailed system 300 RAG architecture. Pre-production, documents 320 from a knowledge base 310 are provided to an embedding model 330. This process may involve "chunking" the information. Note that the system 300 may be associated with a substantial volume of unstructured data (e.g., a corpus with many documents, a library of millions of pictures, thousands of hours of video, etc.). Chunking divides data up into chunks prior to storage, so that each one can be inspected for relevance to an input query during a search. The system 300 may include some overlap in these chunks, to avoid information being split between chunk boundaries (and thus lost). The size and format of these chunks can vary from application to application.

To provide answers in a useful timeframe, RAG needs to rapidly search a database of information on which it was not trained and return relevant pieces of context information. The system 300 may first map the unstructured data to a structured numerical vector via "vector embedding." As used herein, the phrase "vector embedding" may refer to the process of representing an arbitrary piece of unstructured data as an n-dimensional array of numbers. The numbers are not inherently meaningful or interpretable, but they provide a way of comparing two pieces of unstructured data by mapping them to a point in n-dimensional space. Similar pieces of data will sit close to one another in the vector space, and dissimilar pieces of data will be further away.

The embedding model 330 can then store information about embedded documents in a vector database 340. The vector database 340 might include, for each document, text content, vector values, metadata (e.g., a document title, date, or source), etc. As used herein, the phrase "vector database" may refer to a data store that is designed and optimized to handle vector data (as opposed to the tabular data stored by traditional relational databases). They provide efficient storage, indexing and querying mechanisms (optimized for high-dimensional and variable-length vectors) and allow for flexible data storage and retrieval.

The production retriever architecture 350 acts as an internal search engine-given a user query, it returns relevant snippets the originated in the knowledge base 310. The snippets are then fed to a production reader architecture 360 to help it generate a response. Initially, a retriever architecture 350 receives a user query. The retriever architecture 350 includes an embedding model 352 that processes the user query. The embedded user query can then be used to access information from the vector database 340. In particular, the system 300 locates the top-k closest documents to the embedded user query based on semantic similarity. That is, the system wants to find the k documents that have the closest meaning by picking the k closest vectors. There are many ways of measuring the distance between vectors, such as Euclidean distance, Cosine distance, a dot product projection, Manhattan distance, any other state-of-the-art similarity search technique, etc.

This information is provided as context 362 in the reader architecture 360 which processes and aggregates document contents for use in an LLM prompt 364. Such a process may involve prompt compression and/or reranking techniques. As used herein, the term "reranking" may refer to retrieving more documents than needed and then reranking the results with a more powerful model before keeping only the top k. The LLM prompt 364 is then created based on the original user query and the additional relevant context 362. Finally, an LLM 366 converts the LLM prompt 364 into an RAG query answer.

Figure 4:
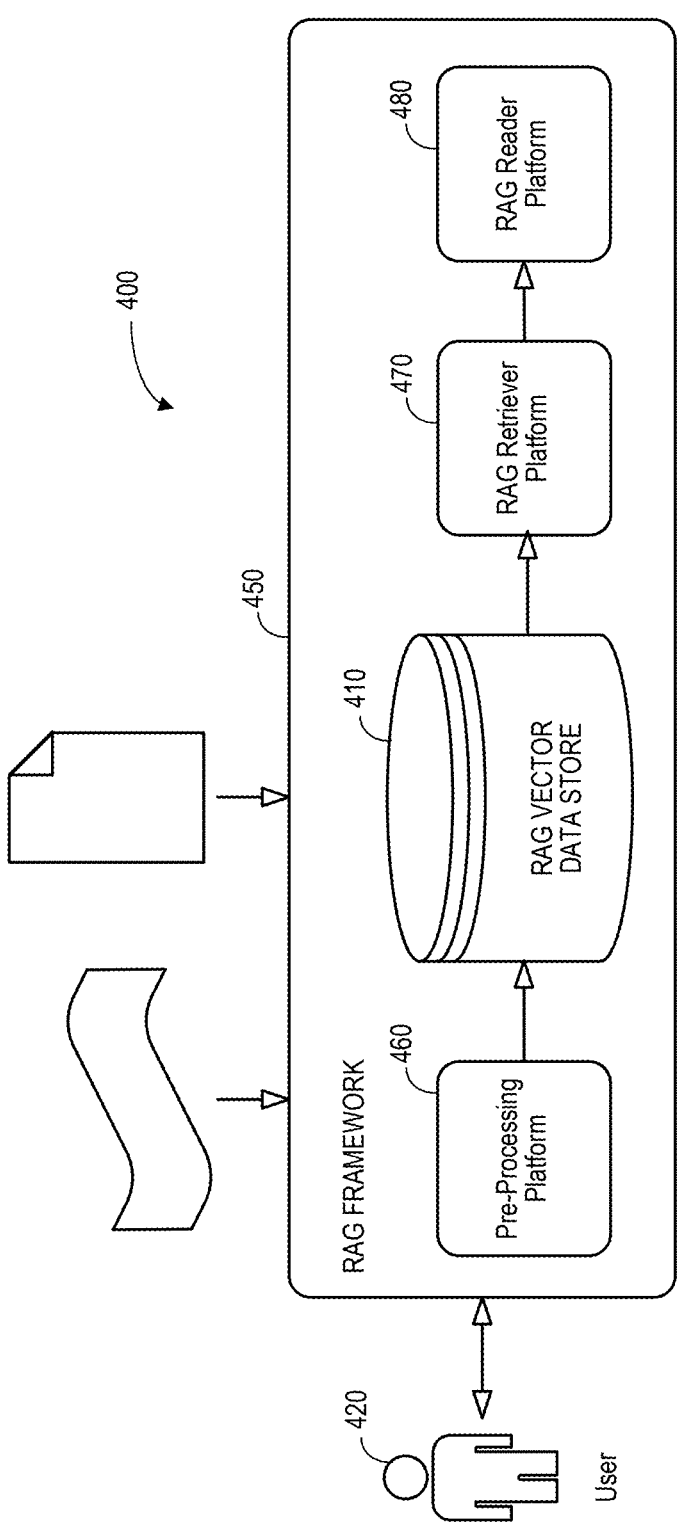
FIG. 4 is a high-level RAG framework architecture in accordance with some embodiments.

While the system 300 is able to handle unstructured documents, it would be helpful it could also efficiently and accurately process structured documents. FIG. 4 is a high-level block diagram of one example of a system 400 architecture according to some embodiments. In particular, an RAG framework 450 may access information about a plurality of structured and unstructured documents from a knowledge base. The RAG framework 450 may then use a RAG pre-processing platform 460 (described in connection with FIGS. 9 and 10) to update an RAG vector data store 410. An RAG retriever platform 470 and RAG reader platform 480 (described in connection with FIGS. 11 and 12) may use information from the RAG vector data store 410 to create a context-aware response to a query from a user 420. According to some embodiments, a remote operator or administrator device may be used to configure or otherwise adjust the system 400.

As used herein, devices, including those associated with the system 400 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The RAG framework 450 may store information into and/or retrieve information from various data stores (e.g., the RAG vector data store 410), which may be locally stored or reside remote from the RAG framework 450. Although a single RAG framework 450 is shown in FIG. 4, any number of such devices may be included. Moreover, various devices described herein might be combined according to embodiments of the present invention. For example, in some embodiments, the RAG vector data store 410 and the RAG pre-processing platform 460 might comprise a single apparatus. The system 400 functions may be performed by a constellation of networked apparatuses, such as in a distributed processing or cloud-based architecture. In some cases, the RAG framework 450 may process information associated with a number of different enterprises.

The enterprise may access the system 400 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via a remote device (e.g., to specify how the elements connect with an enterprise computing environment infrastructure) and/or provide or receive automatically generated recommendations, alerts, summaries, or results associated with the system 400.

FIG. 5 is a method that might be performed by some or all of the elements of the system 400 described with respect to FIG. 4. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S512, an RAG pre-processing platform may access unstructured data associated with a first document from a knowledge base. At S514, the RAG pre-processing platform may perform vector embedding on the unstructured to generate vector embeddings for unstructured data. At S516, the system may then store the vector embeddings for unstructured data in a RAG vector data store along with the first (unstructured) document.

At S18, the RAG pre-processing platform may retrieve structured data associated with a second document from the knowledge base and create a summary and metadata about the structured data at S520. The summary may, for example, describe the content of the second document and include important keywords (e.g., words that describe an overall theme of the document such as "software," "instruction," "GPU," etc.). In some embodiments, the RAG pre-processing platform creates the summary and metadata (e.g., a source path of the second document, hierarchy information, information about related documents, etc.) using a summary LLM and a summary prompt. Moreover, the RAG pre-processing platform may create the summary and metadata further using a compression prompt. At S522, the RAG pre-processing platform performs vector embedding on the summary. At S524, the RAG pre-processing platform may then store the vector embedding for the summary in the RAG vector data store along with attaching the summary and metadata.

At S532, a RAG retriever platform may receive a user prompt from a user and perform vector embedding on the prompt at S534. According to some embodiments, before the embedding is performed on the prompt, the user prompt may be pre-processed, such as by a reduction and/or filtering of specific sections via NLP or an additional LLM prompt (e.g., to improve the quality of retrieved contextual data). At S536, the RAG reader platform may retrieve context-relevant information for the unstructured and structured data by searching for similar embeddings in the RAG vector data store. The similarity search may, for example, find top-k semantically similar text using Cosine similarity, a dot product, Euclidean distance, any other state-of-the-art similarity search technique, etc. At S542, a reader platform may combine the context-relevant information with the user prompt to create a LLM prompt. At S544, the RAG reader platform outputs a context-aware response to the user prompt via the RAG prompt and a LLM. According to some embodiments, the user prompt, similarity search, unstructured data, the summary and metadata, and structured data create inputs to the LLM.

Figure 6:
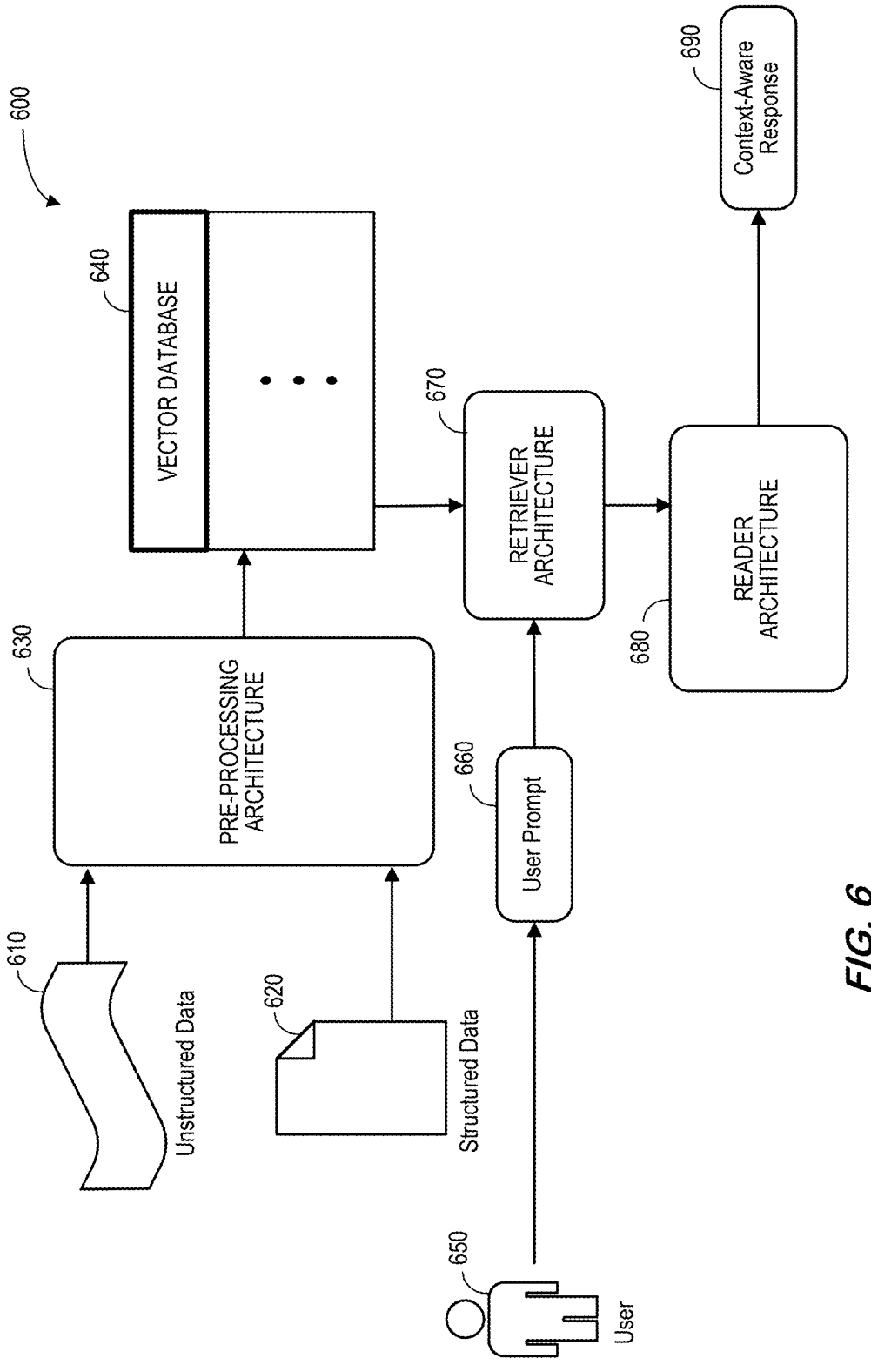
FIG. 6 is a more detailed RAG framework in accordance with some embodiments.

In this way, embodiments may address the challenge of efficiently and accurately retrieving relevant documents (both structured and unstructured) in the context of RAG systems. FIG. 6 is a more detailed RAG framework 600 in accordance with some embodiments. For unstructured data 610, a pre-processing architecture 630 may store embeddings in a vector database 640 in the typical RAG way. In the case of structured data 620, such as project management task tables, typical solutions often fail to deliver reliable results because the similarity search is dependent on the natural language of user input making it unlikely to find textually semantic similarities in structured data. In some embodiments, for each structured document 620 a summary of the content is generated by the ore-processing architecture 630 based on the content and metadata. This summary may be created using LLMs with a prompt that is optimized using prompt engineering techniques. The generated summary can then be stored in the vector database 640 along with a metadata tag that marks the content as a summary (and not the original document content).

A retriever architecture 670 may then retrieve relevant documents using the vector database 640 based on a user prompt 660 (query) received from a user 650. Unstructured data can be used "as is" while the original document content for structured data (identified by the summary metadata tag) is fetched using the source metadata tag. Optionally, the fetched documents (both structured and unstructured) can be further compressed by extracting only the information that is specifically relevant to the user prompt 660. This may be achieved using an LLM compression prompt that is optimized by prompt engineering. The final retrieval-augmentation content, or context, is then infused into the final RAG prompt by a reader architecture 680 that now contains both the context and the user prompt to generate a context-aware response 690.

Figure 7:
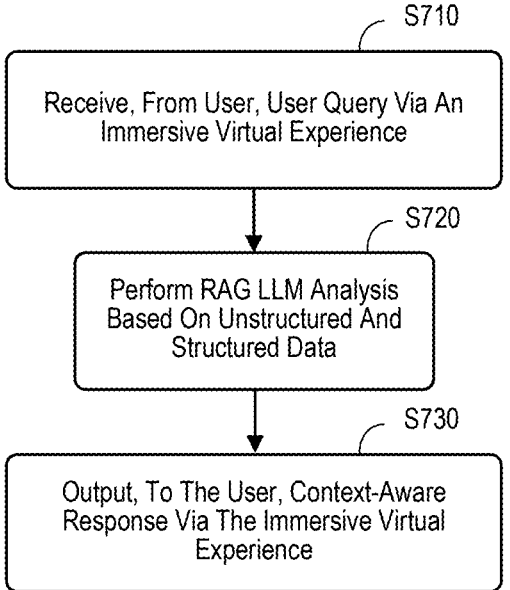
FIG. 7 is an overall RAG method according to some embodiments.
Figure 8:
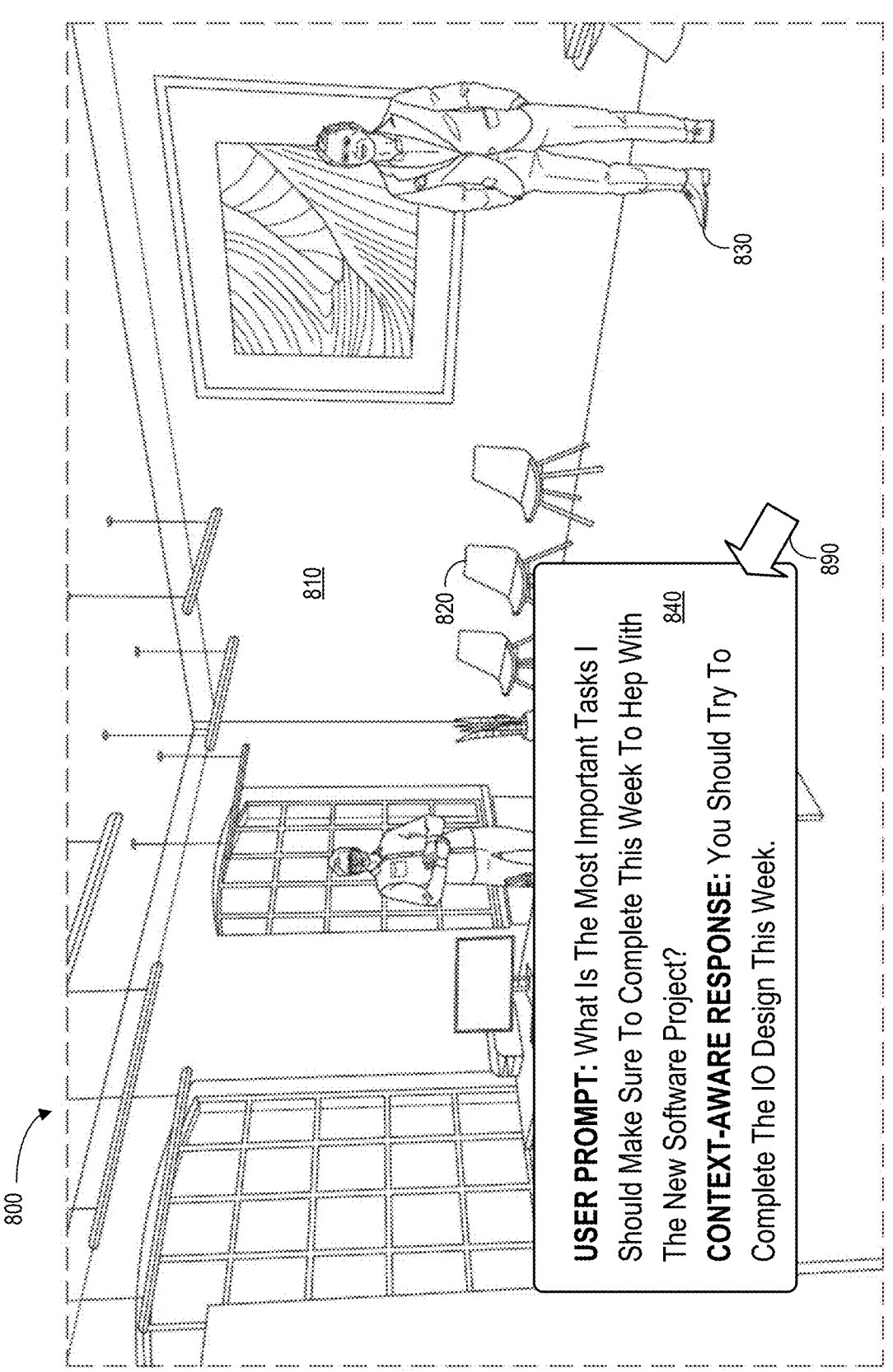
FIG. 8 is an immersive virtual experience in accordance with some embodiments.

Any of the embodiments described herein may be implemented in connection with a wide variety of environments (e.g., text-based, voice interactions, etc.) By way of an example only, FIG. 7 is an overall RAG method according to some embodiments. At S710, a user input is received from a user via an immersive virtual experience. For example, FIG. 8 is an immersive virtual experience 800 in accordance with some embodiments. The experience 800 might include, for example, a room 810 having objects 820 (e.g., furniture) and characters 830. Moreover, a user prompt may be provided in a user Input Output ("IO") area 840 and/or selections might be made via a touchscreen or a computer mouse pointer 890. Referring again to FIG. 7, at S720 an RAG LLM analysis is performed and a context-aware response may be output to the user via the immersive virtual experience at S730 (e.g., the user IO area 840).

Figure 9:
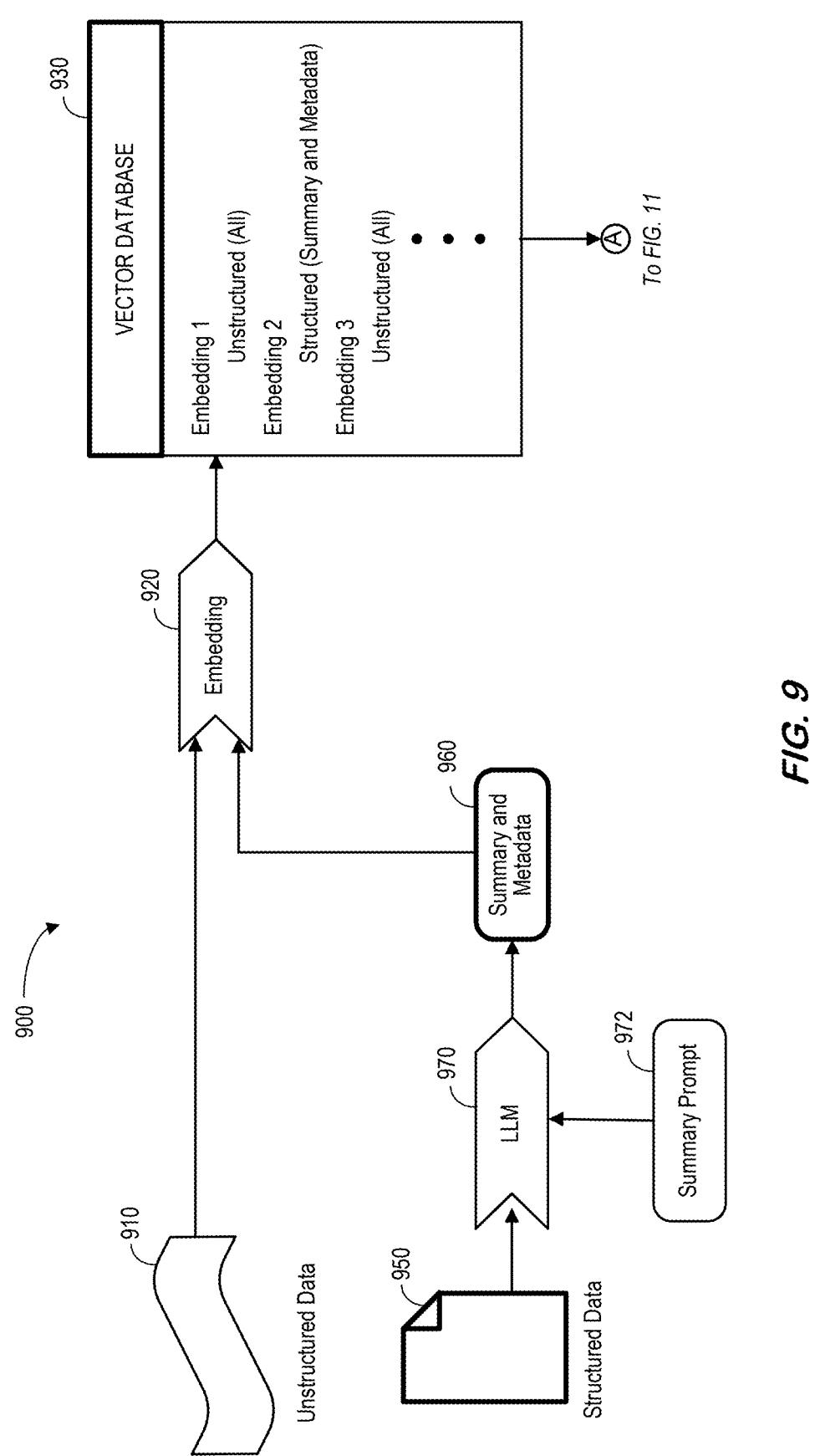
FIG. 9 is a pre-processing framework according to some embodiments.

FIG. 9 is an RAG pre-processing framework 900 according to some embodiments (with emphasis on bolded elements). Unstructured data 910 may undergo embedding 920 with the results stored in a vector database 930. Moreover, according to some embodiments structured data 950 (e.g., a list of enterprise projects or employees) may be used to generate a summary and metadata 960 that also undergoes embedding 920 with the results being stored in the vector database 930. The summary and metadata 960 may be created, according to some embodiments, via an LLM 970 that takes the structured data 950 and a summary prompt 972 (e.g., created via prompt engineering techniques) as inputs.

Figure 10:
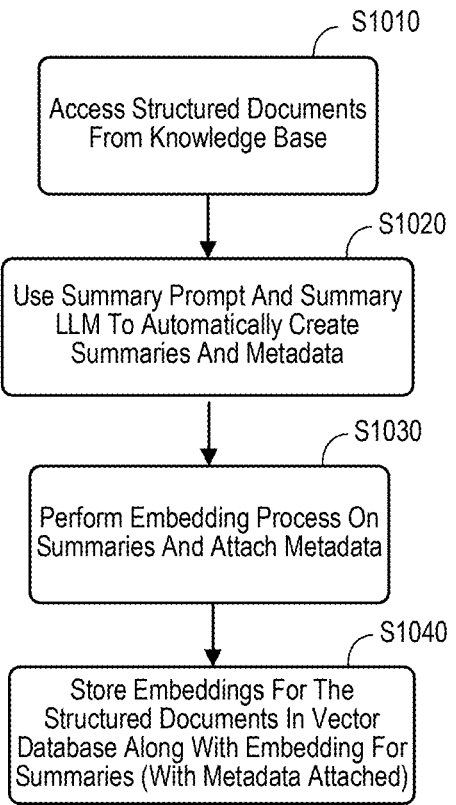
FIG. 10 is a pre-processing method in accordance with some embodiments.

FIG. 10 is an RAG pre-processing method in accordance with some embodiments. At S1010, the system accesses structured data from a knowledge base. At S1020, a summary prompt and summary LLM are used to automatically create summaries and metadata. An embedding service or process may then be used on the summaries at S1030. At S1040, the summary embeddings for the structured documents are stored in a vector database with the metadata attached.

Figure 11:
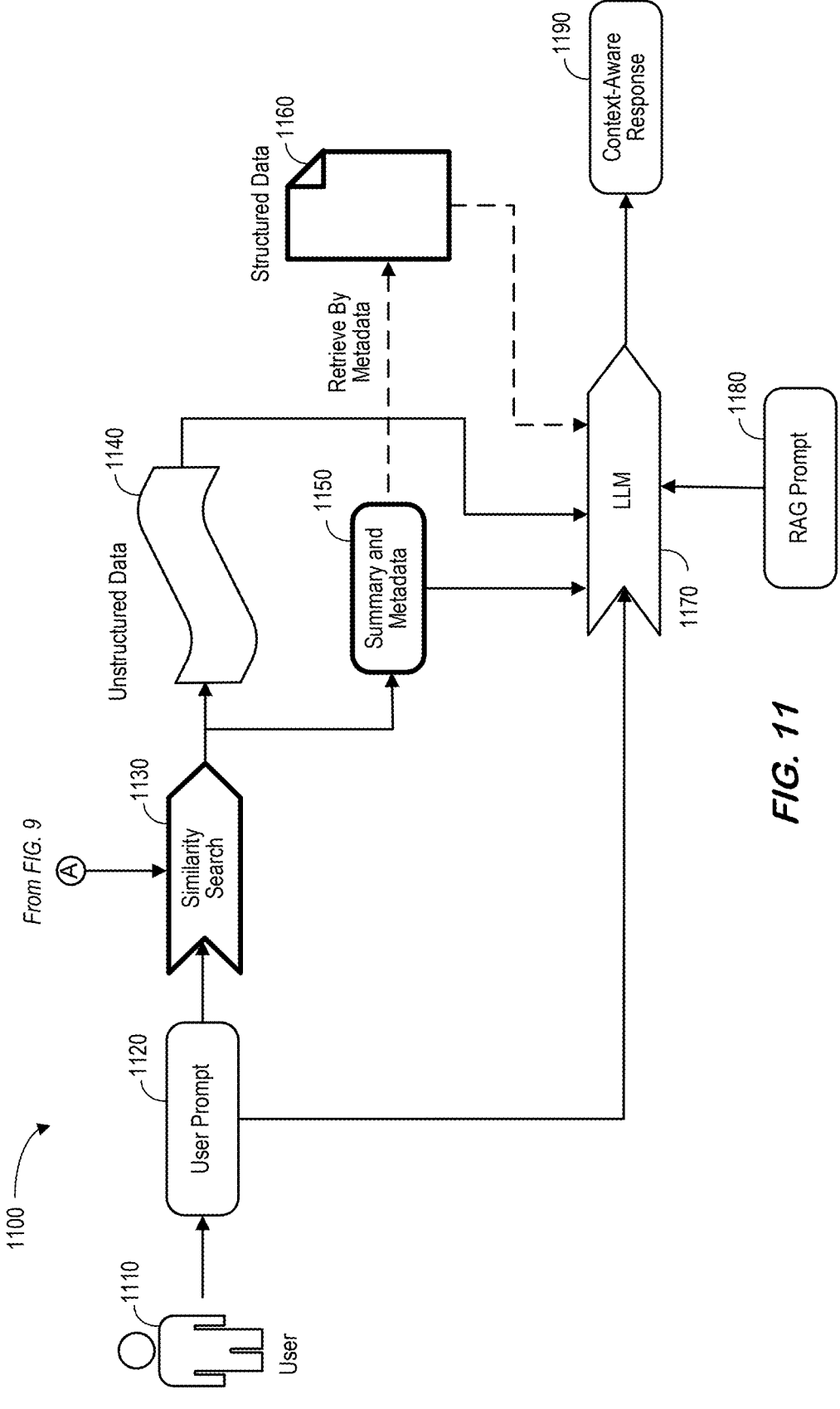
FIG. 11 is an RAG retriever and reader framework according to some embodiments.
Figure 12:
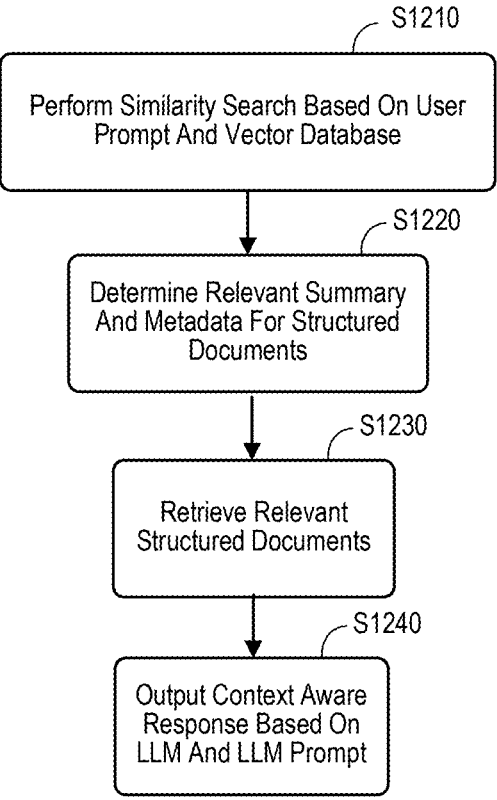
FIG. 12 is an RAG retriever and reader method in accordance with some embodiments.

FIG. 11 is an RAG retriever and reader framework 1100 according to some embodiments (with emphasis on bolded elements). Initially, a user 1110 provides a user prompt 1120 (e.g., a query). A similarity search 1130 is then performed using information from a vector database (e.g., to identify the top k documents linked to relevant data). The similarity search 1130 may identify and extract unstructured data 1140. The similarity search may also identify summary and metadata 1150 that can be used to retrieve the appropriate structured data 1160. That is, the system may retrieve the original structured documents based on the metadata in the vector store (and not only the summary is infused in the final user query). A LLM 1170 may then receive the user prompt 1120, unstructured data 1140, and structured data 1160 along with an RAG prompt 1180 as inputs and generate a context-aware response 1190 to be provided to the user 1110. FIG. 12 is an RAG retriever and reader method in accordance with some embodiments. At S1210, a similarity search is performed based on a user prompt and information in a vector database. At S1220, relevant summary and metadata from structured documents are determined. The relevant structured documents (summaries and metadata) can then be retrieved at S1230, and a content-aware response can be output based on an LLM and an LLM prompt at S1240. Note that the user prompt and context-relevant information are not only combined but may be inserted into a specifically engineered RAG prompt-template.

Figure 13:
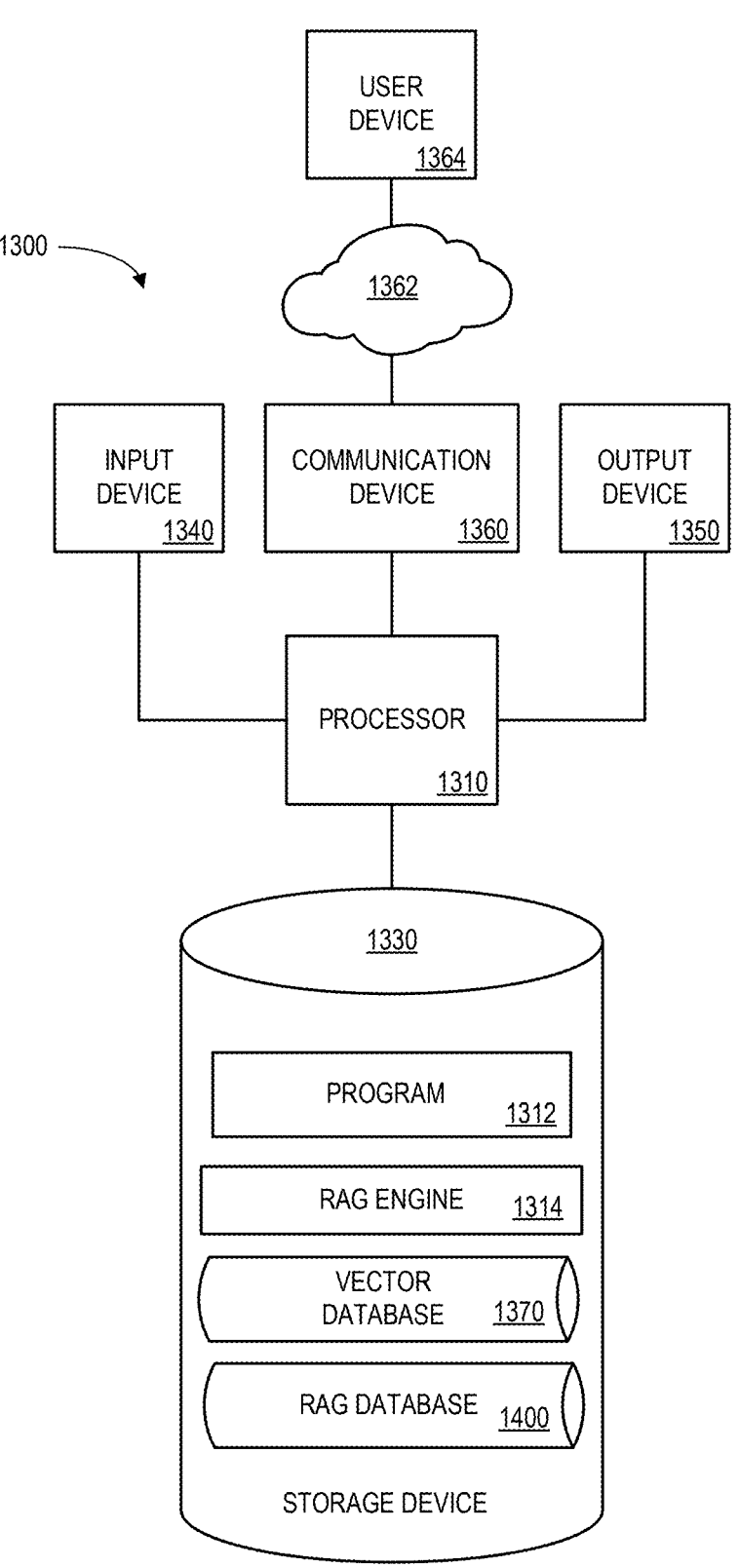
FIG. 13 is an apparatus or platform according to some embodiments.

Embodiments described herein may be implemented using any number of different hardware configurations. For example, FIG. 13 is a block diagram of an apparatus or platform 1300 that may be, for example, associated with the system 400 of FIG. 4 (and/or any other system described herein). The platform 1300 comprises a processor 1310, such as one or more commercially available Central Processing Units ("CPUs") in the form of one-chip microprocessors, coupled to a communication device 1360 configured to communicate via a communication network 1362. The communication device 1360 may be used to communicate, for example, with one or more user devices 1364 via a distributed computer network 1362. The platform 1300 further includes an input device 1340 (e.g., a computer mouse and/or keyboard to input knowledge base information, similarity rules, etc.) and/an output device 1350 (e.g., a computer monitor to render a display, transmit recommendations, charts, alerts, reports about RAG results, etc.).

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1312 and/or RAG engine 1314 for controlling the processor 1310. The processor 1310 performs instructions of the programs 1312, 1314, and thereby operates in accordance with any of the embodiments described herein. For example, the processor 1310 may access unstructured data associated with documents from a knowledge base and perform vector embedding to generate vector embeddings for unstructured data to be stored in an RAG vector database 1370. The processor 1310 may also access structured data from the knowledge base and create a summary and metadata about the structured data to be embedded and stored in the RAG vector database 1370. The processor 1310 may receive a user prompt from a user and retrieve context-relevant information from the unstructured and structured data by embedding the user prompt, searching for similar embeddings in the RAG vector data store, and combining the context-relevant information, the user prompt, and an RAG prompt to create an LLM prompt. A context-aware response to the user prompt may then be output using the LLM prompt and an LLM.

The programs 1312, 1314 may be stored in a compressed, uncompiled and/or encrypted format. The programs 1312, 1314 may furthermore include other program elements, such as an operating system, clipboard application, a database management system, and/or device drivers used by the processor 1310 to interface with peripheral devices.

As used herein, information may be "received" by or "transmitted" to, for example: (i) the platform 1300 from another device; or (ii) a software application or module within the platform 1300 from another software application, module, or any other source.

In some embodiments (such as the one shown in FIG. 13), the storage device 1330 further stores the vector database 1370 and an RAG database 1400. An example of a database that may be used in connection with the platform 1300 will now be described in detail with respect to FIG. 14. Note that the database described herein is only one example, and additional and/or different information may be stored therein. Moreover, various databases might be split or combined in accordance with any of the embodiments described herein.

Referring to FIG. 14, a table is shown that represents the RAG database 1400 that may be stored at the platform 1300 according to some embodiments. The table may include, for example, entries identifying user queries. The table may also define fields 1402, 1404, 1406, 1408, 1410 for each of the entries. The fields 1402, 1404, 1406, 1408, 1410 may, according to some embodiments, specify: an RAG user query identifier 1402, similarity search results 1404, summary and metadata from structured data 1406, an RAG prompt 1408, and a context-aware response 1410. The RAG database 1400 may be created and updated, for example, when new user queries are receive, as an RAG process is performed, etc.

The RAG user query identifier 1402 might be a unique alphanumeric label that is associated with an LLM query received from a user. The similarity search results 1404 may indicate the top unstructured and structured documents that are semantically similar to the user query. The summary and metadata from structured data 1406 may indicate the top structured documents that are similar to the user query (after being retrieved based on metadata). The RAG prompt 1408 might used to create an input to an LLM that generates and outputs the context-aware response 1410.

In this way, embodiments may provide enhanced RAG reliability by improving the reliability of retrieving relevant structured data in response to a user's query. This may be achieved by generating summaries of structured data using a LLM, which are then stored in a vector database. This approach ensures that structured data is as readily and accurately retrievable as unstructured data (addressing a significant limitation of existing RAG solutions). Embodiments may also facilitate optimized efficiency. While the generation of summaries for structured data using an LLM may be initially cost-intensive and time-consuming, the long-term benefits of enhanced search accuracy and efficiency may outweigh these initial costs. The summaries may make the structured data more accessible and searchable (enhancing the overall efficiency of the retrieval process).

Further, embodiments may have a minimal impact on retrieval. Note that the extra step required during the retrieval of summarized documents (fetching the whole document) might not have a substantial impact. The additional time and computational resources associated with this step may be negligible, making the overall process highly efficient. In addition, embodiments may provide improved usability by enabling more accurate and efficient retrieval of both structured and unstructured data. Users can expect more relevant and comprehensive results, which can substantially improve their experience and productivity. Furthermore, embodiments may provide substantial flexibility because it can be adapted to different types of structured data.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of use cases, any of the embodiments described herein could be applied to other types of use cases.

Figure 15:
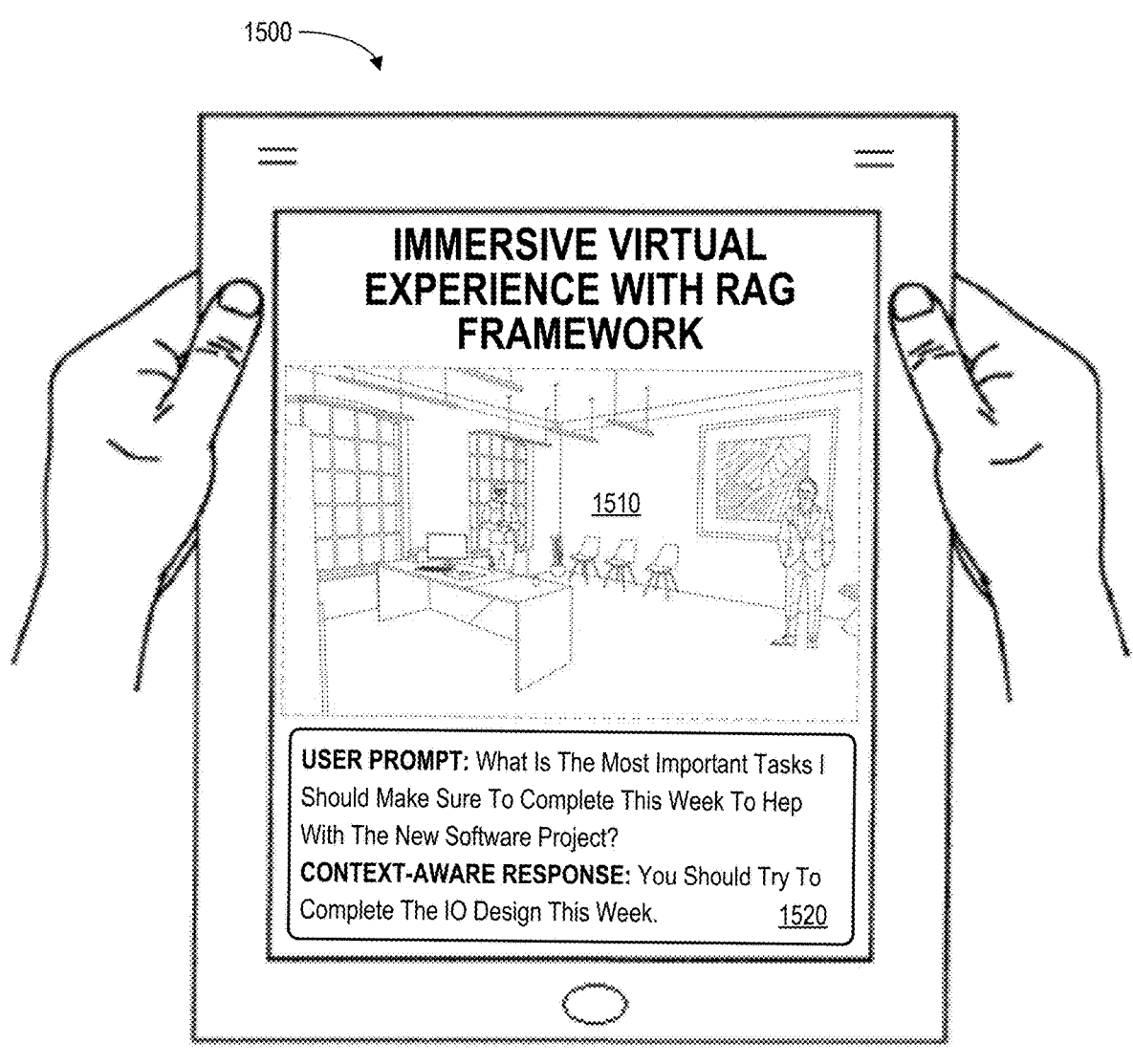
FIG. 15 illustrates a tablet computer immersive virtual experience with RAG framework display according to some embodiments.

In addition, the displays shown herein are provided only as examples, and any other type of user interface could be implemented. For example, FIG. 15 illustrates a tablet computer 1500 providing an immersive virtual experience with RAG framework display 1510 according to some embodiments. The display 1510 might be used, for example, to train medical students how to interact with patient or employees about new safety guidelines being implemented by an enterprise. A user may interact with the display 1510, such as via a user IO area 1520 to provide a prompt for an LLM.

Figure 16:
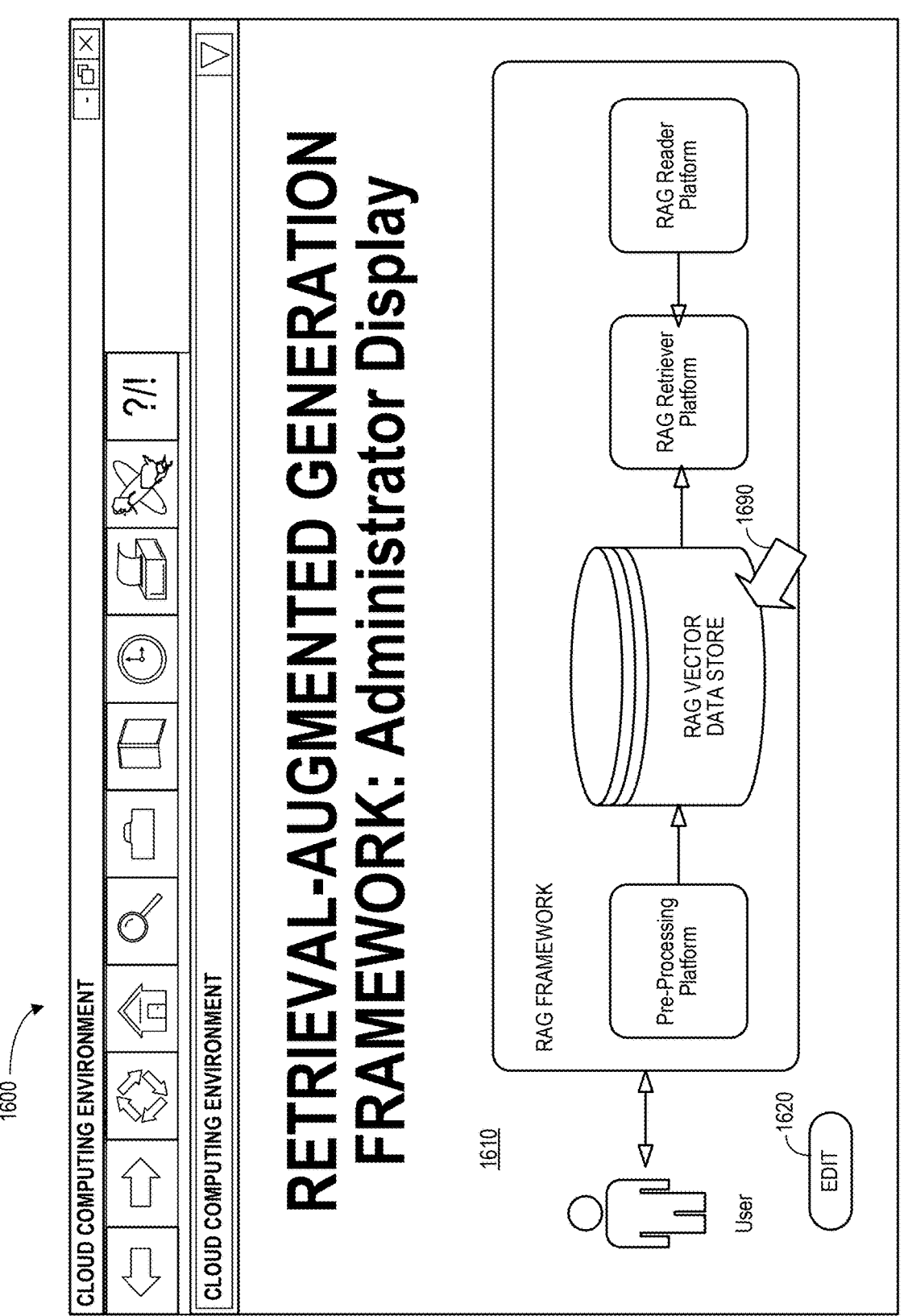
FIG. 16 is an operator or administrator RAG framework display in accordance with some embodiments.

FIG. 16 is an operator or administrator RAG framework display 1600 in accordance with some embodiments. The display 1600 includes a graphical representation 1610 of an RAG framework in accordance with any of the embodiments described herein. Selection of an element on the display 1600 (e.g., via a touchscreen or computer pointer 1690) may result in display of a pop-up window containing more detailed information about that element and/or various options (e.g., to define how a data store interacts with the framework, how users communicate with the framework, etc.). Selection of an "Edit" icon 1620 may also let an operator or administrator adjust the operation of the system (e.g., to change a mapping to a data store, adjust similarity search parameters, make changes to a summary LLM prompt, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with a Retrieval-Augmented Generation ("RAG") framework, comprising:
   an RAG vector data store that contains information about a plurality of vector embeddings; and
   an RAG pre-processing platform, coupled to the RAG vector data store, including:
      a computer processor, and
      a computer memory storing instructions that when executed by the computer processor cause the RAG pre-processing platform to:
         access unstructured data associated with a first document from a knowledge base,
         perform vector embedding on the unstructured data to generate a vector embedding for unstructured data,
         store the vector embedding for unstructured data in the RAG vector data store along with the first document,
         access structured data associated with a second document from the knowledge base,
         create a summary and metadata about the structured data,
         perform vector embedding on the summary and metadata to generate a vector embedding for structured data, and
         store the vector embedding for structured data in the RAG vector data store along with the summary and metadata.

2. The system of claim 1, further comprising:
   an RAG retriever platform, coupled to the RAG vector data store, to:
   receive a user prompt from a user,
   perform vector embedding on the user prompt, and
   retrieve context-relevant information for unstructured and structured data by searching for similar embeddings in the RAG vector data store; and
   an RAG reader platform, coupled to the RAG retriever platform, to:
   combine the context-relevant information with the user prompt and an RAG prompt to create a Large Language Model ("LLM") prompt, and
   output a context-aware response to the user prompt via the LLM prompt and a LLM.

3. The system of claim 2, wherein prior to performing vector embedding on the user prompt, the system performs pre-processing of the user prompt via at least one of: (i) reduction of specific sections via Natural Language Processing ("NLP"), (ii) filtering of specific sections via NLP, and (iii) an additional LLM prompt.

4. The system of claim 2, wherein the RAG retriever platform retrieves the first document directly from the RAG vector data store.

5. The system of claim 4, wherein the RAG retriever platform retrieves the second document based on the metadata.

6. The system of claim 2, wherein the summary describes content of the second document and includes important keywords.

7. The system of claim 2, wherein the RAG pre-processing platform creates the summary and metadata using a summary LLM and a summary prompt.

8. The system of claim 7, wherein the RAG pre-processing platform creates the summary and metadata further using a compression prompt.

9. The system of claim 2, wherein the metadata includes at least one of: (i) a source path for the second document, (ii) hierarchy information, and (iii) information about documents related to the second document.

10. The system of claim 2, wherein the searching finds top-k semantically similar text using at least one of: (i) Cosine similarity, (ii) a dot product, (iii) Euclidean distance, and (iv) any other state-of-the-art similarity search technique.

11. The system of claim 2, wherein the RAG pre-processing platform further splits information into chunks of a predetermined length.

12. The system of claim 2, wherein the user prompt and context-aware response are provided via an immersive virtual experience.

13. The system of claim 1, wherein the summary describes content of the second document, including one or more keywords descriptive of an overall theme of the second document.

14. The system of claim 1, wherein the RAG pre-processing platform creates the summary and metadata using a summary LLM and a summary prompt.

15. The system of claim 1, wherein the RAG pre-processing platform creates the summary and metadata using a compression prompt.

16. One or more non-transitory computer-readable media storing computer-executable instructions that, when executed by a computing system, cause the computing system to perform operations associated with a Retrieval-Augmented Generation ("RAG") framework, comprising:

accessing, by an RAG pre-processing platform, unstructured data associated with a first document from a knowledge base;

performing, by the RAG pre-processing platform, vector embedding on the unstructured data to generate a vector embedding for unstructured data;

storing, by the RAG pre-processing platform, the vector embedding for unstructured data in a RAG vector data store along with the first document, wherein the RAG vector data store contains information about a plurality of vector embeddings;

accessing, by the RAG pre-processing platform, structured data associated with a second document from the knowledge base;

creating, by the RAG pre-processing platform, a summary and metadata about the structured data;

performing, by the RAG pre-processing platform, vector embedding on the summary and metadata to generate a vector embedding for structured data;

storing, by the RAG pre-processing platform, the vector embedding for structured data in the RAG vector data store along with the summary and metadata;

receiving, by a RAG retriever platform, a user prompt from a user;

performing, by the RAG retriever platform, vector embedding on the user prompt;

retrieving, by the RAG retriever platform, context-relevant information for unstructured and structured data by searching for similar embeddings in the RAG vector data store;

combining, by a RAG reader platform, the context-relevant information with the user prompt to create a Large Language Model ("LLM") prompt; and outputting, by the RAG reader platform, a context-aware response to the user prompt via the LLM prompt and a LLM.

17. The media of claim 16, wherein the RAG retriever platform retrieves the first document directly from the RAG vector data store.

18. The media of claim 17, wherein the RAG retriever platform retrieves the second document based on the metadata.

19. The media of claim 18, wherein the metadata includes at least one of: (i) a source path of the second document, (ii) hierarchy information, and (iii) information about documents related to the second document.

20. The media of claim 17, wherein the RAG retriever platform further splits information into chunks of a predetermined length and the user prompt and context-aware response are provided via an immersive virtual experience.

21. The media of claim 16, wherein the user prompt, a result of the search for similar embeddings in the RAG vector data store, the unstructured data, the summary and metadata, and the structured data are provided as inputs to the LLM.

* * * * *